Oct. 30, 1962  J. A. HERBST ETAL  3,060,883
MINE SWEEPING SYSTEM
Filed May 14, 1956

INVENTORS
JOHN A. HERBST
BY  SYLVAIN GARNETT

ATTORNEY

3,060,883
MINE SWEEPING SYSTEM

John A. Herbst, Lake Valhalla, Montville, and Sylvain Garnett, Fairlawn, N.J., assignors to Bogue Electric Manufacturing Co., Paterson, N.J., a corporation of New Jersey
Filed May 14, 1956, Ser. No. 584,534
8 Claims. (Cl. 114—221)

This invention relates to a mine sweeping system, and more specifically, concerns a system which is advantageously adapted for use with either air or water borne carrier means.

In conventional mine sweeping systems of the type utilizing a pulsating direct current output and heavy cables for carrying such output, the necessary direct current generator for providing the large amperage current, the cables and cable drums and winches, all taken together constitute large weights and masses which must be accommodated in marine sweepers of appropriate capacity.

While it has been suggested that mine sweeping operations could be conducted more efficiently from air-borne carriers for the electrical generators and auxiliary equipment, as by means of helicopters; the weight problem previously mentioned renders the use of the usual small capacity helicopter impractical.

Accordingly, one object of this invention is to provide an improved electrical generating system for mine sweeping operations, wherein the generator and associated electrical components, including cables and the like, have a total weight which is a small fraction of the weight of conventional electrical systems used for the same purpose.

Furthermore, with conventional mine sweeping systems based on a direct current generator, in addition to degaussing the water borne carrier of such generator, it is also necessary to neutralize the magnetic effect of the pulsating currents in the generator, and therefore requiring supplemental degaussing equipment, which further burdens the carrier.

Accordingly, a further object of this invention is to provide an improved electrical generating and supply system for mine sweeping, wherein the generator does not give rise to magnetic effects requiring neutralization by degaussing or the like, thus further reducing the weight and bulk of required auxiliary equipment which must be transported in the limited space available in water borne mine sweepers.

Other objects of this invention will in part be obvious and in part hereinafter pointed out.

In the drawing, FIG. 1 is a diagrammatic representation of a mine sweeping system embodying the invention;

In one conventional mine sweeping system using a direct current generator to supply current to a trailing cable, in a manner known in the art, such generator may have to provide a current of about 1000 amperes at about 100 volts. The cable required to carry such a current is of substantial section and weight, requiring extensive cable drum and winch installations.

Furthermore, such a generator has a limited rotational speed of the order of about 3,000 r.p.m. and may weigh as much as 2,000 pounds. It follows that such a current supply must be carried by a water borne sweeper of substantial capacity. Furthermore, such a current supply could not feasibly be carried by the usual small capacity helicopter, in view of the excessive weight of such a current supply.

However, it has been found that an improved current generator system may be provided which has the necessary current output, yet has a total weight which is but a small fraction of the total weight of conventional current supplies.

Figure 1:
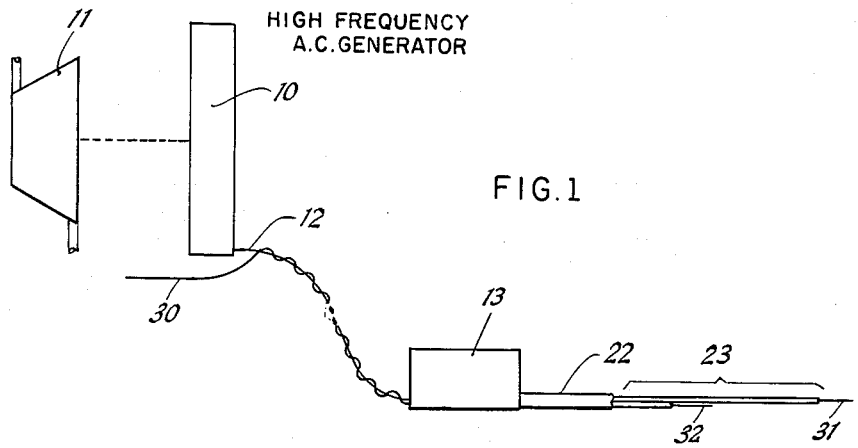

Such an improved current supply system is shown in FIG. 1, wherein 10 designates an alternating current generator adapted to rotate at a speed of about 30,000 r.p.m. and providing an output current with a frequency of from about 3,000 to about 10,000 cycles; preferably about 5,000 cycles, at about 1000 volts and about 100 amperes. The generator is driven by a suitable prime mover, such as a gas turbine 11.

Figure 2:
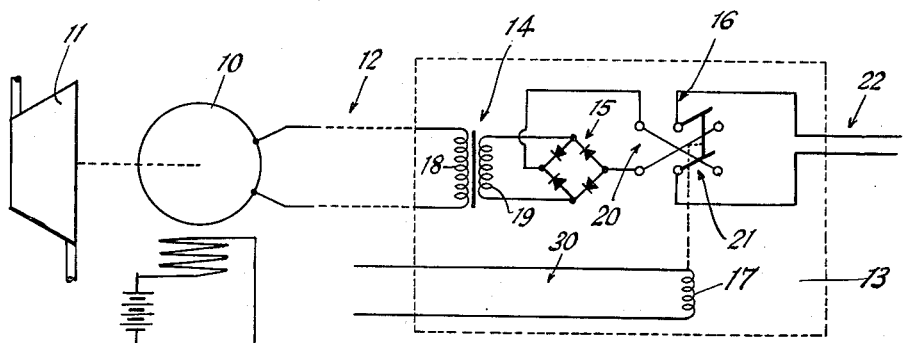
FIG. 2 is a circuit diagram of the electrical components of said system.

The output of generator 10 is carried by a cable 12 made up of conductors of small cross section and of light weight, to a water tight, buoyant casing 13 wherein is disposed a power transformer 14, a full wave rectifier 15, a polarity reversing switch 16 and a relay 17 for actuating switch 16, as indicated in FIG. 2.

The cable 12 is connected to the primary winding 18 of transformer 14, the secondary winding 19 thereof being connected to the input side of rectifier 15. The output side of rectifier 15 is connected to terminals 20 of switch 16; the terminals 21 of said switch being connected to a cable 22 having a detonating portion 23 at the outer end thereof.

Figure 3:
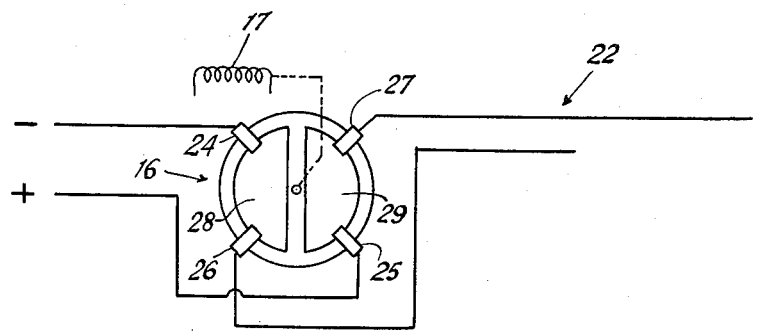
FIG. 3 is a diagrammatic representation of a polarity reversing switch used in said system.

The switch 16, as shown in FIG. 3, may be of the type having fixed pairs of diametrically opposed contacts 24, 25; 26, 27, and a pair of semicircular contact plates 28, 29 arranged for rotation by means of relay 17, thus interconnecting the fixed contacts in a manner to reverse the polarity of the current derived from rectifier 15 and delivered to cable 22. A small relay cable 30 may extend from relay 17, along power cable 12, to be connected to a pulsing means, not shown, whereby switch 16 may be operated in a manner known in the art.

The transformer 14, operating at 5,000 cycles, is adapted to step down the output voltage of generator 10, to about 100 volts at about 1000 amperes, which current is rectified to provide the required direct current supply for cable 22.

Cable 22, which is of relatively short length, is made up of insulated conductors 31, 32 of unequal length, each of said conductors being stripped of insulation at the outer ends thereof, thus providing the detonating portion 23, when said conductors are in the water.

Since the high frequency generator 10 may have a weight not exceeding about 75 pounds, and since the output of such generator permits cable 12 to be formed of small, light weight conductors, the total weight of generator 10 and cable 12 and including the light relay cable 30 therewith, is still but a small fraction of the weight of a conventional direct current generator and its associated heavy output cable. The output cable 22 herein is of relatively short length inasmuch as it extends only from casing 13. Accordingly, the total weight of the entire system, including casing 13 and the components therein, still is within the load carrying limitations of a small capacity helicopter, and furthermore, may be carried by water borne vessels such as small launches rather than the usual, large capacity sweepers.

Furthermore, when the current supply of the instant invention is carried in a water borne vessel, such supply will not give rise to the magnetic waves incident to conventional current supplies, thus materially reducing the need for protective degaussing equipment for the vessel.

As various changes might be made of the embodiment of the invention herein shown without departing from the spirit thereof, it is understood that all matter shown or described shall be deemed illustrative and not by way of limitation except as set forth in the appended claims.

Having thus disclosed our invention, we claim as new and desire to protect by Letters Patent:

1. A mine sweeping system comprising in combination, a high frequency alternating current generator operative to produce a high voltage, low amperage output current, a step-down transformer, a cable having small conductors of light weight per unit length connecting said generator and transformer, a rectifier in circuit with the output of said transformer, and a short detonating cable connected to the output of said rectifier.

2. A mine sweeping system comprising in combination, a high frequency alternating current generator for providing a high voltage, low amperage output current, a step-down transformer, a long cable having small sized conductors connecting said generator and the primary winding of said transformer, a short detonating cable having large sized conductors, and a full wave rectifier in circuit with the secondary winding of said transformer and said detonating cable.

3. A system as in claim 2 and further including a polarity reversing switch in circuit with said rectifier and said detonating cable.

4. A system as in claim 3 and further including a relay for actuating said switch and light weight cable means for supplying current to said relay.

5. A mine sweeping system comprising in combination, an alternating current generator operating at from 3,000 to 10,000 cycles and providing a high voltage, low amperage current, a water buoyant casing, a long cable containing small size, light weight conductors extending from the output of said generator to said casing, means within said casing operatively connected to said generator by said cable for stepping down the voltage of said current and substantially increasing the amperage thereof, rectifier means within said casing for converting said high amperage current to direct current, and a short detonating cable containing large size, heavy weight conductors connected to the output of said rectifier means and extending from said casing.

6. A system as in claim 5 and further including a polarity reversing switch within said casing and connected between said rectifier means and said detonation cable, and means within said casing for actuating said switch.

7. A system as in claim 6 wherein said last mentioned means comprises a relay and a light weight cable connected to said relay and extending from said casing for carrying current to energize said relay.

8. A mine sweeping system comprising a light weight high frequency alternating current generator operative to provide a high voltage, low amperage output current, means for converting said alternating current output to a low voltage, high amperage direct current, an extended, light weight cable connecting the input of said means and the output of said generator, and a short, heavy detonating cable extending from the output of said means.

References Cited in the file of this patent

UNITED STATES PATENTS

| | | |
|---|---|---|
| 2,353,360 | Ronning | July 11, 1944 |
| 2,397,209 | Schaelchlin | Mar. 26, 1946 |
| 2,446,303 | Owen | Aug. 3, 1948 |
| 2,782,365 | Castel | Feb. 19, 1957 |
| 2,787,758 | Walstrom | Apr. 2, 1957 |